United States Patent [19]

Joubert et al.

[11] 4,441,313
[45] Apr. 10, 1984

[54] MOUNTING DEVICES FOR MULTIPLE FLOW TURBOJET ENGINES

[75] Inventors: Raymond J. M. Joubert, Savigny sur Orge; Jean G. Bouiller, Brunoy, both of France

[73] Assignee: Societe Nationale d'Etude et de Construction de Moteurs d'Aviation, "S.N.E.C.M.A.", Paris, France

[21] Appl. No.: 204,582

[22] Filed: Nov. 6, 1980

[30] Foreign Application Priority Data

Nov. 12, 1979 [FR] France .................. 79 27771

[51] Int. Cl.³ .................. F02K 1/40; F02K 3/02
[52] U.S. Cl. .................. 60/262; 60/39.32; 74/520; 74/106; 138/37; 138/113; 138/114; 248/555; 248/556
[58] Field of Search .................. 60/262, 226 R, 39.31, 60/39.32; 415/159; 244/53 R, 54; 74/520, 106; 138/37, 113, 114, 39; 248/554, 555, 556, 557

[56] References Cited

U.S. PATENT DOCUMENTS

| 2,936,978 | 5/1960 | Lauck .................. 60/39.31 |
| 2,936,999 | 5/1960 | Coar et al. . | |
| 3,412,560 | 11/1968 | Gaubatz .................. 60/271 |
| 3,886,737 | 6/1975 | Grieb .................. 60/226 R |

FOREIGN PATENT DOCUMENTS 2102187 4/1972 France .

Primary Examiner—Carlton R. Croyle
Assistant Examiner—Jeffrey A. Simenauer
Attorney, Agent, or Firm—Bacon & Thomas

[57] ABSTRACT

A mounting device for mounting the exhaust casing of a turbojet engine on a rigid support structure connected with an aircraft, there being at least two flows, i.e., a primary flow in the exhaust casing and a secondary flow in a shroud which surrounds the casing and which is fastened to the support structure by a rigid ring. The device consists of a plurality of arms each having means to control its orientation.

3 Claims, 5 Drawing Figures

MOUNTING DEVICES FOR MULTIPLE FLOW TURBOJET ENGINES

BACKGROUND OF THE INVENTION

The invention concerns aircraft turbojet engines and more particularly relates to a mounting device, on the aircraft, having a turbine, said turbine having an axis of the rear part of a multiple flow turbojet engine having at least two concentric flows.

In a general member, when a turbojet engine is secured at its front and rear to a rigid supporting structure (for example, an aircraft strut) attached to the aircraft, the rear mount is applied to the exhaust casing of the turbine, which constitutes the rear part of the stator shroud and supports the rear bearing. When the turbojet engine is of the double of triple flow type, the exhaust casing—which contains the central primary flow—is suspended in the shroud of the secondary flow, which itself is mounted directly on the supporting structure. This suspension of the exhaust casing is effected by means of a plurality connecting elements distributed around the casing. Each of these elements consists of an arm, with a cross section profiled to accommodate the flow.

Each connecting element is equipped with first fastening means for connection to the shroud of the secondary flow and with second fastening means for connecting to the exhaust casing. This results in that:

the secondary flow shroud is rigidly joined to the supporting structure, the exhaust casing is rigidly joined to the shroud of the secondary flow, and the rear bearing is joined rigidly to the exhaust housing.

This rigidity of the different connections in question results in the fact that when a large accidental imbalance appears in the course of operation (due, for example, to the loss of a moving blade), the exhaust casing is exposed simultaneously to cyclic radial stresses applied by the bearing and to the reactions of the rigid assembly and the large inertial mass constituted by the shroud of the secondary flow and the support structure. The stator shroud of the turbine, to which the exhaust casing belongs, thus undergoes cyclic deformations. Furthermore, the dimensional errors of manufacture—which are unavoidable no matter what precautions are taken in the course of metalworking and machining and which increase with increasing transverse dimensions of the turbojet engine—cause deformation during the installation of the exhaust casing, in the shroud of the secondary flow, which inevitably affect the stator.

These causes of permanent deformation make it necessary to provide an appreciable clearance between the rotor and the stator which is detrimental to the performance of the turbojet engine.

SUMMARY OF THE INVENTION

It is the object of the present invention to eliminate these causes of deformation and to make it feasible to reduce the radial clearance between the stator and the rotor. It also facilitates the mounting of the shroud of the secondary flow around the exhaust casing.

According to its most general definition, the device of the invention intends to secure the exhaust casing of a turbojet engine having at least two flows to a rigid support structure joined to an aircraft. The two flows may be, for example, a central primary flow contained by the exhaust casing and a secondary flow contained by a shroud surrounding the exhaust casing and attached to the support structure. The device is of a type comprising a plurality of connecting elements distributed around the exhaust casing and each comprising an arm oriented in a plane transverse to the axis of the rotor of the turbine, first fastening means to attach the arm to the shroud of the secondary flow casing, and second fastening means to attach the arm to the exhaust casing, said device being essentially characterized in that the first fastening means of each arm comprise on the one hand an articulation of the arm joining one section of the arm with the shroud of the secondary flow while leaving the arm free to rotate in said transverse plane, and on the other hand, a tie of variable length oriented in said transverse plane and joined respectively to the secondary flow shroud and to another section of the arm by means of two tierod articulations free to rotate in said transverse plane.

The invention thus makes it possible, during the installation of the shroud of the secondary flow around the stator shroud and the exhaust casing, to assign an optimum orientation to said arms of the fastening elements. Advantageously, each tierod is provided with means to render it elastically deformable. Later, it will be seen how this disposition eases the consequences of certain grave failures of the turbojet engine.

A further advantage of the invention results from the second joining means of each arm conferring on the arm, relative to the exhaust casing, a freedom of rotation in said transverse plane and a freedom of translation in the direction of said plane passing in the vicinity of the turbine axis. It will be seen later herein how this disposition eases in particular the consequences of the differential expansion appearing in the course of operation.

BRIEF DESCRIPTION OF THE DRAWINGS

Other dispositions relate specifically to.

the application of the invention to turbojet engines with triple flows, particularly advantageous embodiment of the device of the invention, the technical embodiment of the first and second joining means of the arms, shall be disclosed in the description hereinbelow of an embodiment with reference to the drawings, wherein.

In general, the figures show only the elements necessary for the comprehension of the descriptions.

DESCRIPTION OF THE PREFERRED EMBODIMENT

The figures following hereinbelow, as indicated, concern the application of the invention to a triple flow turbojet engine.

Figure 2:
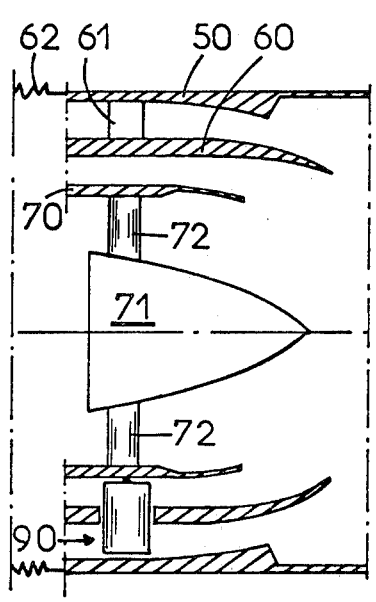
FIG. 2 is a partial axial section taken on the line 6—6 of FIG. 1.
Figure 1:
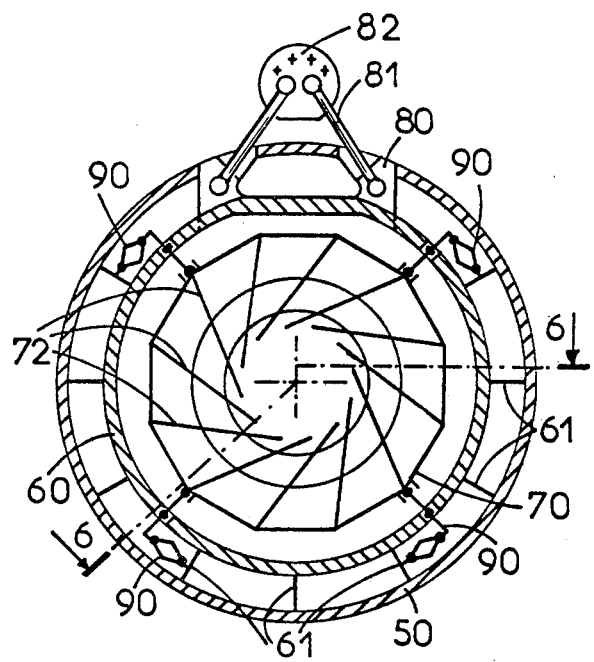
FIG. 1 is a transverse section of a triple flow turbojet engine equipped with the device of the present invention.

Let us consider first and simultaneously FIGS. 1 and 2. They show a rigid, external ring 50 which constitutes the rear part of the shroud for the tertiary flow, a rigid intermediate ring 60 which constitutes the rear part of the shroud for the secondary flow and an internal ring formed by the exhaust casing 70 and surrounding the cone 71 of the rear bearing support. The latter is secured to the ring 70 by means of a plurality of profiled arms 72. The ring 50 and the ring 60 are linked rigidly, on the one hand by the rear frame 80 suspended by the tierods 81 from a case 82 (only its forward flange shown) integral with an aircraft strut, not shown, and on the other by a plurality of radial attach spacers 61. The external ring 50 is joined to the forward body of the shroud of the tertiary flow by a tight, deformable joint consisting of an elastic bellows 62. The tierods 81 and the case 82 are visible in FIG. 1 and not in FIG. 2.

According to the invention, the ring 70 is suspended in the ring 60 by means of four connecting elements 90 which shall be described later with reference to FIGS. 4 and 5.

Figure 3:
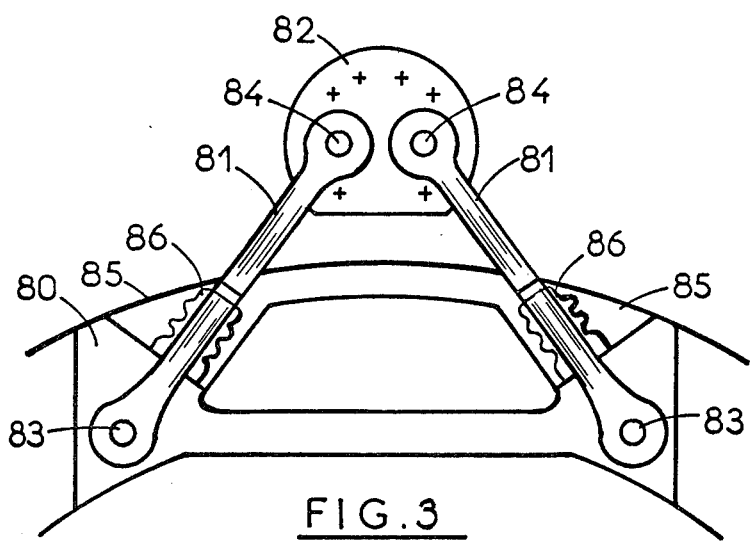
FIG. 3 is a view on a larger scale of the suspension means shown in FIG. 1.

Let us consider now FIG. 3. The lower ends of the tierods 81 are connected with the frame 80 by axles 83, while the upper ends are connected to the case 82 by means of axles 84. If the system would be infinitely rigid, the two tierods, the flange of the case 82 and the frame 80 would form a nondeformable quadrangle because the rotation of the nondeformable assembly consisting of the rings 50 and 60 around its axis is made impossible by the forward link. However, the elastic deformations of the structures connected by the tierods 81 permit slight displacements inside the passages 85 of the tierods 81 provided in the frame 80. Each body 81 of the tierods is surrounded by a cylindrical bellows 86 which connects the body with the outlet of the corresponding passage in order to ensure the tightness of the tertiary jet flow.

Figure 4:
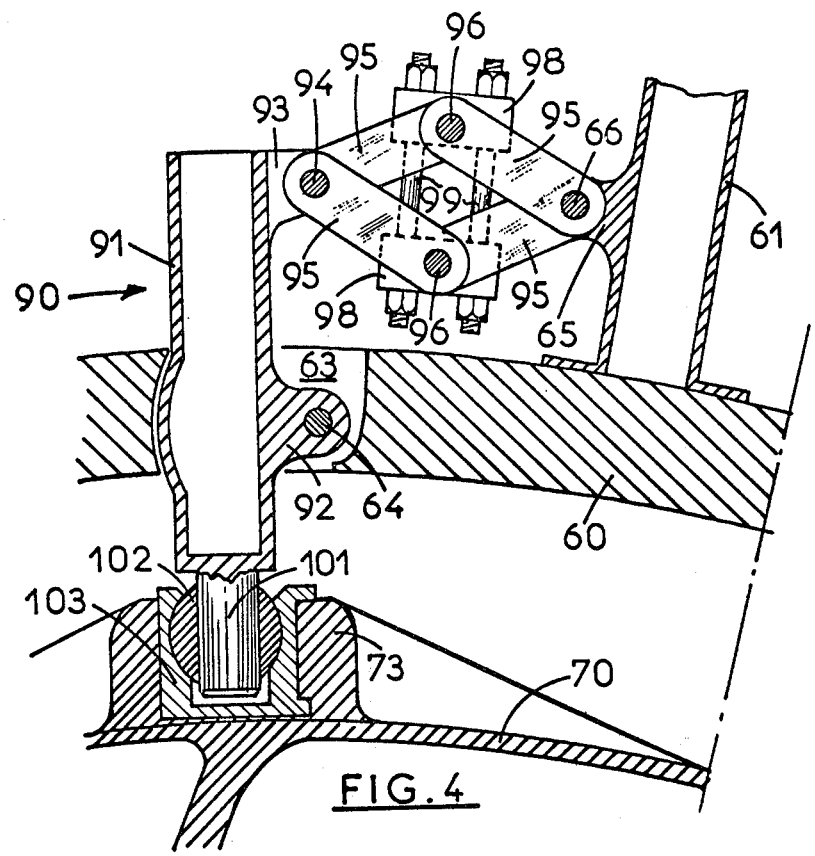
FIG. 4 is a view on a larger scale of one of the fastening elements shown in FIG. 1.
Figure 5:
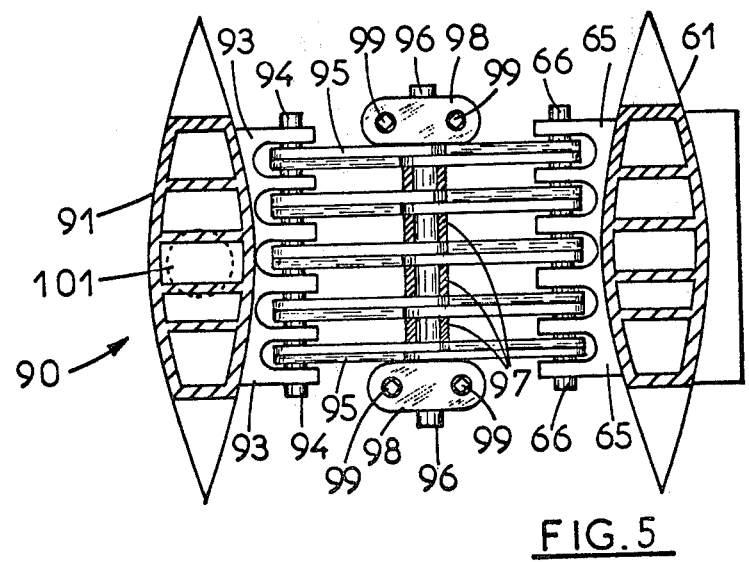
FIG. 5 is a top view of the fastening element shown in FIG. 4.

Let us consider finally FIGS. 4 and 5 which represent schematically one of the connecting elements 90 shown in FIG. 2.

The arm 91 with its profiled box extends through a passage 63 in the ring 60. It has an extension 92 by which it is pivoted on an axle 64 located in the passage 63 with its axis oriented parallel to the axis of the turbine. The arm 91 is thus free to rotate in a plane transverse to the axis of the turbine.

The arm 91 carries at its external end (i.e., the end in the tertiary flow path) a plurality of ears 93 traversed by an axle 94 parallel to the axle 64. The stationary attach spacer 61, of the shape shown, has in its medium section, the ears 65 which extend toward the ears 93 and which are traversed by an axle 66 that is parallel to the axle 64.

In each of the intervals separating two ears 93, the axle 94 supports by their ends a first pair of tierods 95. In each of the opposing intervals, the axle 66 supports by their ends a second pair of tierods 95. A pair of axles 96 connects a tierod of one pair of tierods with a tierod of the other pair. Thus, the axles 66 and 94 are connected with each other by a plurality of identical, deformable parallelograms, each consisting of four tierods 95. Spaces 97, placed on the axles 96 between the pairs of tierods ensure the bracing of these parallelograms, the assembly whereof constitutes a deformable, dihedral parallelogram providing the connection between an orientable arm 91 and a stationary attach spacer 61. The ends of each axle 96 extend outwardly of both sides of the tierods 95 forming the bases of said parallelogram and each end bears a cheek member 98. The two cheek members which flank the same base are joined by two bolts 99 parallel to each other, placed on either side of the two axles 96 and entering threaded holes provided in said cheek members. At opposite ends of the bolts 99, the threading is inversed (of reverse hand), together with the corresponding threading of the cheek members 98, so that the inclination of the arms 91 may be adjusted during assembly by rotating the bolts 99.

The internal end of each arm 91 (placed in the secondary flow path) has a cylindrical stud 101 (shown by a dotted line in FIG. 5), which engages with a slight friction the reamed hole provided in a swivel 102. The latter is inserted in a spherical housing provided in a bearing 103, which itself is capable of sliding in a channel 73, integral with the shroud 70 and oriented parallel to the axis of the turbine.

The different elements, located in a plane transverse to the axis of the turbine and which have been described hereinabove with reference to FIGS. 4 and 5, thus cooperate to regulate and impart to each arm 91 a given orientation in a plane parallel to the axis of the turbine and to provide said arm, relative to the exhaust casing 70, with a freedom of position in said plane, a freedom of radial translation (i.e., in a direction passing through the axis of the turbine) and a freedom of axial translation (i.e., in a direction parallel to said axis).

According to a detail variant, the end 101 of each arm 91 may be force mounted in the swivel 102 and the freedom of axial translation of the arm 91 relative to the shroud 70 is assured by means of the sliding of the swivel bearing 103 which would be made capable of sliding in both the radial and axial direction in the channel 73.

Suitable values of stiffness and inertia of the connection effected by the tierods 95 are obtained by assigning to said tierods definite dimensions in order to ensure the absorption of vertical and horizontal stresses, together with the force couples in this plane. It may be noted that the different parallelogram also represent variable braces to adjust the connection between the two shrouds constituting the stator.

It will be noted, to complete this description, that the technical solutions described hereinabove with reference to FIGS. 4 and 5, are also applicable to double flow turbojet engines.

We claim:

1. A device for mounting to a rigid support structure (80) of an aircraft having a turbine, said turbine having an axis, a turbine exhaust casing (70) in a turbojet engine of the type having at least two flows, i.e. a central primary flow in the exhaust casing (70) and a secondary flow in a first shroud (60) surrounding the exhaust casing (70) and fastened to said support structure (80), said device comprising a plurality of connecting elements around the exhaust casing (70) and each comprising an arm (91) oriented in a plane transverse to the axis of the turbine, first means attaching each arm (91) to said first shroud (60) and second means attaching each arm (91) to the exhaust casing (70), wherein the first means attaching each arm (91) comprise an articulated joint (64-92) linking an intermediate portion of each arm (91) to the first shroud (60) while leaving the arm (91) free to rotate in the transverse plane containing said arms (91) and a tie (94 to 99) variable in length and oriented in said transverse plane, consisting of an arrangement of a plurality of parallelograms, each formed by four tierods (95) of the same length pivoted in pairs at their ends around four axles of articulation (66, 94, 96) common to all of the parallelograms and determining respectively four edges of dihedrons of a parallelepiped, one (66) of the axles being linked by means of an attach spacer (61) with the first shroud (60) of the secondary flow and with a second shroud (50) external to the first shroud (60) and fixed to the said support structure (80) and to a portion of the arm by means of first and second articulated joints free to rotate in said transverse plane and another axle (94) being linked with the arm (91) of the connecting elements (90) permitting the arm (91) to rotate relative to the exhaust casing (70) in said transverse plane and to have freedom of relative translation in said plane and further having a channel (73) fixed relative to the exhaust casing (70) thereby leaving the arm (91) free to translate relative to the exhaust casing (70) in a direction parallel to said axis, said tie (94 to 99), and further means to adjust a value of the dihedron angle of the arrangement, said means to adjust a value of the dihedron angle comprising at least one bolt (99) linking two consecutive tierods of at least one of the parallelograms and which consecutive tierods (95) are articulated on one of the axles (66, 94) connected with the attach spacer (61) and the arm (91).

2. A mounting device according to claim 1 wherein said second means of attachment comprise a swivel (102) at the end of each arm (91) and a bearing (103) housing the swivel (102) and sliding in the channel (73) fixed relative to the exhaust casing (70).

3. A mounting device according to claim 1, wherein the turbojet has a triple flow path with each of the shrouds for the second flow path and the shroud for the tertiary flow path has a rigid ring (60, 50), the two rings (50, 60) being mounted on the support structure (80) and braced by stationary attach spacers (61), the articulated joint (64-92) of the arm of the first means of attachment of the arm (91) is linked directly with the ring (60) of the shroud for the secondary flow path and the first articulated joint (65-66) of the tie (94 to 99) is linked to the stationary attach spacers (61).

* * * * *

UNITED STATES PATENT AND TRADEMARK OFFICE
CERTIFICATE OF CORRECTION

PATENT NO. : 4,441,313

DATED : 10 April 1984

INVENTOR(S) : Joubert et al.

It is certified that error appears in the above-identified patent and that said Letters Patent is hereby corrected as shown below:

Col. 1 line 7 delete "the" insert --an--

Col. 1 line 8 delete "having a turbine, said turbine having an axis"

Col. 1 line 11 delete "member" insert --manner--

Col. 1 line 17 delete "of" (second occurrence) insert --or--

Col. 3 line 50 delete "medium" insert --median--

Col. 3 line 61 delete "Spaces" insert --Spacers--

Signed and Sealed this

Fourth Day of September 1984

[SEAL]

Attest:

Attesting Officer

GERALD J. MOSSINGHOFF

Commissioner of Patents and Trademarks